June 2, 1931.  S. J. FINN  1,807,835
TRIMMING MACHINE
Filed June 4, 1927  2 Sheets-Sheet 1
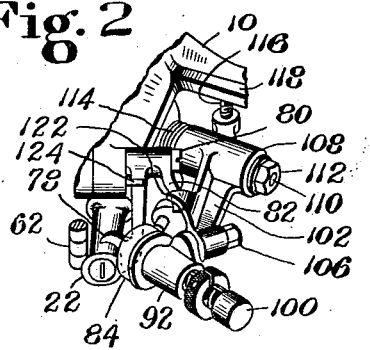
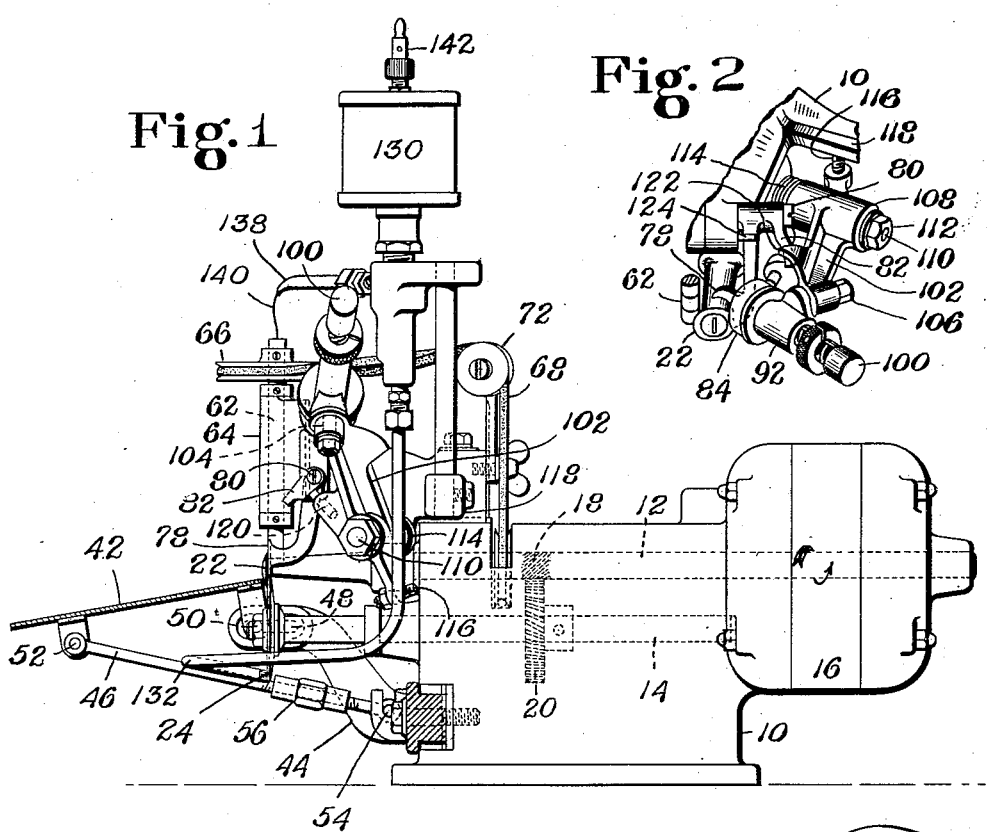
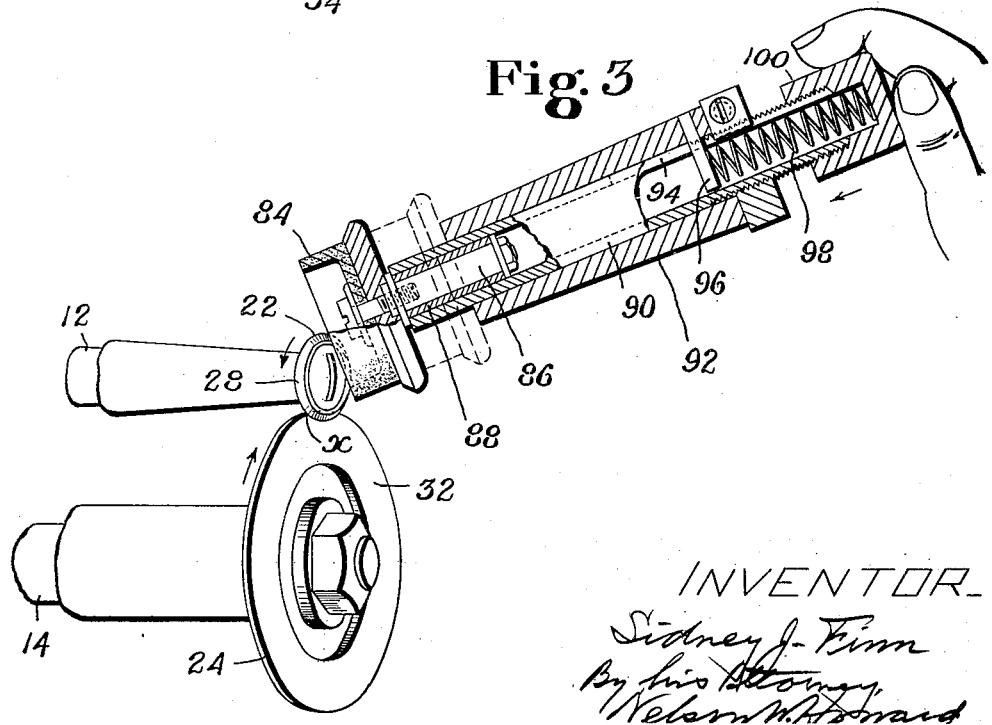
INVENTOR
Sidney J. Finn
By his Attorney
Nelson W. Howard

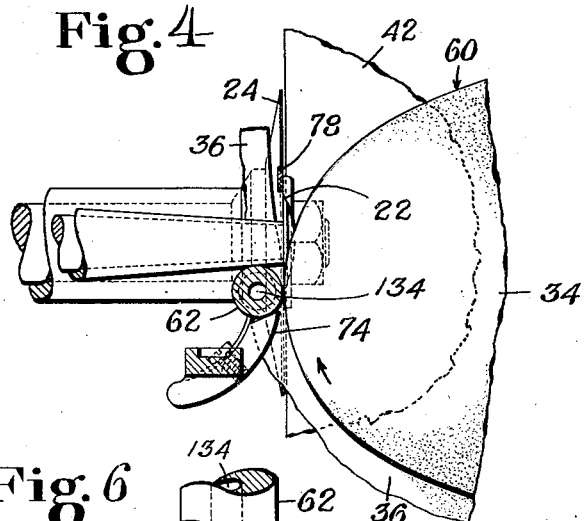
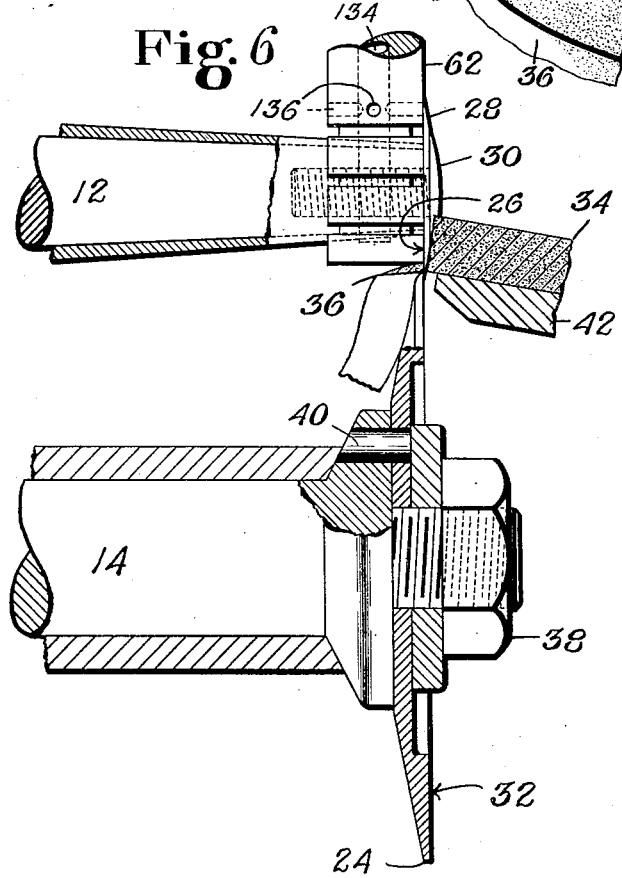
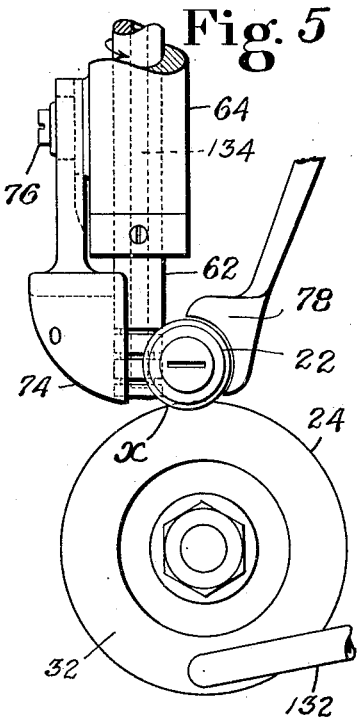

Patented June 2, 1931

1,807,835

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed June 4, 1927. Serial No. 196,574.

This invention relates to trimming machines and is herein illustrated as embodied in a machine having rotary shearing cutters arranged to trim off a thin marginal extension projecting from the body of an article of work. More specifically, the illustrated machine is designed to trim off fins of overflow commonly formed on molded rubber articles such as soles and heels. It is to be understood, however, that the invention is not limited to machines of the type illustrated nor to trimming overflow from molded rubber articles.

In machines heretofore provided for the purpose stated, the trimming has been done by rotary disk cutters arranged in shearing relation, and the article of work has been guided relatively to the cutters by a guard arranged in front of one of the cutters to be engaged by the fin-bearing face of the work. Consequently, to sever all of the fin it has been necessary, with former trimming machines, to incline the work-guiding face of the guard relatively to the plane of the shearing cut and to support the work so that the fin-bearing face thereof will be correspondingly inclined. While such inclining of the fin-bearing face counteracts the thickness of the guard, it produces an undesirable effect on the work, viz., the fin, instead of being severed flush with the fin-bearing face, is severed at an angle thereto, with the result that the severing cut also trims off some of the body of the work.

In view of the conditions above explained, an object of the present invention is to provide an improved trimming machine by which a fin may be severed flush with the fin-bearing face, to the end that the new surface formed by the severing cut will merge smoothly with the profile of the fin-bearing face. Therefore, a feature of the invention consists in a novel organization comprising two cooperative shearing cutters one of which is arranged to lie against the fin-bearing face of the work and is provided with a thin, acute cutting edge, and means arranged to engage said face adjacent to the shearing locality and in the shearing plane to prevent said face from crossing the shearing plane. As shown, the means for preventing the fin-bearing face from crossing the shearing plane comprises two spaced guards arranged one at the feeding-in side of the acute-edged cutter and the other at the feeding-out side thereof, and each of them is behind but tangent to the shearing plane. In practice, that at the feeding-out side does not engage the work except when an incurved fin-bearing face, for example an incurved heel-breast or the inner edge of the shank of a sole, is presented to the cutters. Then, the guard at the feeding-out side is effective to prevent the trimmed portion of the work from rubbing or touching the back edge of the cutter guarded thereby.

The rotation of the cutters has the effect of feeding the work, although this effect is counteracted more or less by the frictional retarding effect of the work-support. Therefore, to supply a supplemental feeding effect one of the aforesaid guards of the illustrated machine, preferably the one located at the feeding-in side of the cutting locality, is made circular, is arranged to rotate and is driven by suitable transmission means so that it will function not only as a guard but also as a feed-roll. Moreover, this rotary guard is constructed and utilized to conduct a lubricant to one of the cutters and to discharge the lubricant by centrifugal force due to its rotation.

It is desirable to resharpen, periodically, the upper cutter of the illustrated machine, but since access to this cutter by a grinding device is obstructed by a work-guiding member and other elements that function closely adjacent to said cutter, another object of the invention is to provide an improved organization by which such resharpening may be accomplished without detaching the cutter or any of the other parts of the machine. To accomplish this purpose, the invention provides for automatic displacement from, and restoration to, its operative position of an obstructing work-guiding member by a grinding device arranged to be shifted to and from the cutter. The illustrated mechanism by which this result is obtained is designed to lock the displaceable element positively in its operative position when the grinding device is fully retracted from the cutter.

Other novel features of the invention are hereinafter described and claimed and are illustrated in the drawings.

Referring to the drawings,

Fig. 1 is a rear elevation of a trimming machine embodying the present invention;

Fig. 2 is a perspective view including one of the cutters, a grinding device for sharpening said cutter, and a cutter-guard arranged to be displaced by the grinding device;

Fig. 3 is a perspective view, partly in section, showing the grinding device in cooperative relation to one of the cutters;

Fig. 4 is a top plan view, partly in section, showing the cutters, their guards, and a portion of a rubber sole in process of being trimmed;

Fig. 5 is an elevation including the cutters and the cutter guards; and

Fig. 6 is a view on a larger scale, partly in front elevation and partly in vertical section, showing the cutters and a sole in process of being trimmed.

The general organization of the illustrated machine is similarly in many respects to that of the machine more fully shown and described in Letters Patent of the United States No. 1,534,257, granted April 21, 1925, on application of J. A. Brogan.

The frame 10 of the machine is provided with bearings for two horizontal cutter shafts 12 and 14 which, though apparently in parallel relation as viewed in Fig. 1, are slightly skewed relatively one to the other to insure the most desirable relation of the cutters hereinafter described. In this type of machine the cutter shaft 12 is also the rotor shaft of an electric motor 16. A pinion 18 formed on the shaft 12 meshes with a gear 20 on the shaft 14 to cause the shafts to rotate in opposite directions. Cutters 22 and 24 are carried respectively by the shafts 12 and 14 and are arranged in lapped shearing relation as clearly shown in Figs. 3 and 5. The cutter 22 is provided with a sharp, acute cutting edge formed by a flat rear face 26 and a beveled front face 28. A screw 30 having a thin rounded head is screwed into the shaft 12 and extends through a central hole in the cutter 22 to fasten the latter to the shaft. The cutter 24 is provided with a flat front face 32 against which the flat face 26 of the cutter 22 is arranged, the beveled face 28 of the cutter 22 being thereby arranged to be engaged by the work, as shown in Figs. 4 and 6, in which a rubber sole is indicated at 34, while the fin of overflow to be trimmed off is indicated at 36. The cutter 24 is fixed to the shaft 14 by a clamping nut 38 and a dowel 40. The slight skewing of the cutter shafts above mentioned restricts the contact of the cutters to a point indicated at $x$ in Figs. 3 and 5, at which point the shearing takes place in the plane of the front face 32 of the lower cutter.

A flat work table is indicated at 42 in Figs. 1, 4 and 6. It is preferably mounted in such manner that it may be adjusted to various angles of inclination as may be preferred by the operator or required by the character of the work. As shown in Fig. 1, the table is supported by a two-armed bracket 44 and a strut 46. The bracket 44 is affixed to the frame 10 and its arms, one of which is shown, are formed with horizontal slots 48 to receive trunnions 50 projecting from the table. One end of the strut 46 is connected to the work table by a pivot 52 and its other end is connected by a pivot 54 to a fixture which, as shown, is a portion of the bracket 44. Furthermore, to provide for regulating the inclination of the table, the strut 46 is made in the form of a turn-buckle, the double nut of which is indicated at 56. Any preferred means may be used to secure the trunnions 50 to the bracket 44, for example nuts screwed on the trunnions and arranged to clamp the arms 44.

When a sole, for example, is placed upon the table 42 and presented to the cutters, as shown in Figs. 4 and 6, the fin 36 of overflow projects across the shearing plane of the cutters, but the upright face 60 of the sole, that is, the face from which the overflow projects, is brought to bear against the beveled front face 28 of the upper cutter 22. This cutter, by reason of its contact with the upright face, 60, exerts a considerable feeding force on the work, which force is supplemented by the bite of the two cutters on the fin 36. The fact that the cutter 22, which is relatively thin and sharp, is arranged in front of the lower cutter provides for trimming the fin 36 flush with the face 60, without, however, trimming off any portion of the body of the sole. It may be observed, by reference to Figs. 4 and 6, that the upright face 60 is substantially tangent to the shearing plane of the cutters, and that the fin 36 may be trimmed off by turning the sole and otherwise moving it in the direction indicated by the arrow in Fig. 4. Now, while flush trimming requires maintaining a point of the upright face 60 in tangent relation to the shearing plane of the cutters, it is necessary to prevent the face 60 from projecting across said plane adjacent to the cutters, since if the face 60 intersected the shearing plane adjacent to the cutters, the upper cutter 22 would cut into the body of the sole. The invention therefore provides an abutment to prevent the face 60 from crossing the shearing plane, said abutment being behind said plane but tangent thereto and nearly if not quite in contact with the rear face of the upper cutter. The abutment for this purpose is preferably a rotary driven roll 62, and its axis is preferably vertical. As shown in Figs. 1 and 5, the abutment 62 is the lower portion of a spindle arranged to rotate in a fixed bearing 64, and its upper portion is provided with a pulley 66 to which rotation is transmitted by a belt 68 driven by a pulley 70 on the cutter shaft 12. The belt also runs over sheaves one of which is indicated at 72. The belt is crossed between the pulley 66 and the sheaves 72, and the abutment 62 is therefore driven in a direction that produces a feeding effect supplemental to that of the cutters.

Since the abutment 62 is in tangent relation to the shearing plane, it is necessary for the fin 36 of overflow to pass under it, as shown in Fig. 6, the abutment being thus arranged to have rolling contact with the upright face 60 of the sole. To insure the passage of the fin 36 under said abutment, the machine is provided with a stationary guide 74 (Figs. 4 and 5) which is arranged to be engaged by the work in advance of the abutment 62. The lower edge of the guide 74 is arranged to deflect the fin 36 downwardly so that it will pass under the abutment 62. The guide 74, as shown, is affixed to the bearing 64 by a clamping screw 76 and is vertically adjustable. As shown in Fig. 5, the stationary guide 74 is spaced from the cutter 22 to provide a gap, and the work-engaging portion of the roll 62 extends across this gap.

The machine is also preferably provided with a guard 78 for the cutter 22, this guard being arranged to guide trimmed portions of a concave face of the work and to prevent the operator's fingers from touching the cutting edge of the cutter 22 at the feeding-out side of the latter. The guard 78 is segmental or crescent-shaped to conform substantially to and cover a considerable arc of the cutter 22, as shown in Fig. 5, and it is arranged to guard that segment of the cutting edge that is diametrically opposite the trimming locality. As shown in Figs. 1 and 4, the front face of the guard 78 is in flush relation to the rear face 26 of the upper cutter, this being the operative position of the guard. This guard is preferably arranged to be displaced from its operative positon to afford access to the cutter 22 for the purpose of sharpening the cutting edge thereof, and accordingly the guard is connected to the frame of the machine by a pivot 80. Furthermore, a finger 82 formed on the guard provides for moving the latter to and from its effective position, as hereinafter explained.

The grinding device shown in Figs. 1, 2 and 3 comprises an abrading element 84 in the form of a roll. It is fastened to a cylindric stem 86 journaled in a bearing sleeve 88. This sleeve is tightly fitted in an outer sleeve 90 arranged to slide lengthwise in a bearing piece 92, a slot 94 being formed in the sleeve 90 to receive a pin 96 fixed to the bearing piece 92. The pin 96 not only prevents rotation of the sleeve 90 but it provides an abutment for a compression spring 98 nested in the sleeve 90. This spring also bears against a knob 100 screwed upon the outer end of the sleeve 90 and adapted to be grasped by the operator first to move the element 84 into register with the cutter 22 and thereafter to advance the element 84 axially into engagement with the cutter 22. The spring 98 normally maintains the abrading element retracted to the position indicated by broken lines in Fig. 3 but a light pressure is sufficient to advance the abrading element into engagement with the cutter 22 so that the end face of the abrading element will grind the beveled face 28 of the cutter.

The operative position of the grindng device is shown in Figs. 2 and 3, but said device is normally maintained in an inoperative position, as shown in Fig. 1. In addition to the structure heretofore described, the grinding device also comprises an arm 102 to which the bearing piece 92 is connected by a stem 104 fixed relatively to the bearing piece 92 and extending through a bore in the arm 102. A clamping nut 106 is screwed on the stem 104 to clamp the bearing piece 92 rigidly to the arm 102, and the connection thus formed provides for angular adjustment of the bearing piece 92 relatively to the arm 102. A hub 108 formed on the arm 102 is bored to receive a horizontal spindle 110 affixed to the frame 10 and is retained on said spindle by a nut 112. A torsion spring 114 coiled about the spindle 110 normally raises the grinding device to the position shown in Fig. 1.

When the operator wishes to use the grinding device to sharpen the cutter 22 he grasps the knob 100 first to swing the arm 102 downwardly until the abrading element 84 is in register with the cutter 22, and thereafter to advance the abrading element relatively to the bearing piece 92, as hereinbefore described. As the abrading element is brought down to the level of the cutter, it is arrested in register with the cutter by a stop screw 116 carried by the arm 102 and arranged to engage the under side of a stationary abutment 118 which, as shown, is a portion of the frame 10.

As hereinbefore stated, the guard 78 is adapted to be displaced from its effective position to afford access of the abrading element to the cutter 22, the guard being connected to the frame 10 by a pivot 80 to provide for such displacement. As shown in Fig. 1, a pin 120 affixed to the arm 102 bears initially against the under side of the finger 82 formed on the guard 78, the guard being thereby held positively in its effective position. Now, when the grinding device is depressed from the position shown in Fig. 1 to that shown in Figs. 2 and 3, it carries the pin 120 away from the finger 82, thereby releasing the guard 78 and permitting the force of gravity to swing the guard away from the cutter 22, as shown in Fig. 2. In case the guard sticks when it is released by the pin 120 it will be positively displaced from its effective position by a finger 122 (Fig. 2) formed on the arm 102. This finger is arranged to engage the upper side of the guard finger 82.

When the sharpening of the cutter 22 has been completed, both the grinding device and the guard 78 will return automatically to their initial positions. For example, the operator has merely to release the knob 100 of the grinding device, whereupon the spring 98 will retract the abrading element 84 to the position indicated by broken lines in Fig. 3, and at the same time the torsion spring 114 (Figs. 1 and 2) will raise the arm 102 to the position shown in Fig. 1. As the grinding device is thus raised by the spring 114, the pin 120 projecting from the arm 102 strikes the under side of the finger 82 and thereby restores the guard 78 to its effective position where it is arrested by a stop pin 124 (Fig. 2) projecting from a portion of the frame.

In machines for cutting rubber the friction of the rubber on the cutters is so great that it is customary to lubricate the latter. Accordingly, the illustrated machine is provided with an oil-cup 130 to supply any suitable or preferred liquid lubricant, for example, water with or without a soapy content or a proportion of kerosene. This cup is above the level of the cutters to provide for gravity feed of the lubricant to the cutters. As shown, a small supply pipe 132 is arranged to conduct lubricant from the cup to the front face 32 of the lower cutter.

The upper cutter 22 is so small and the space adjacent to it so extensively occupied by the guards 62, 74 and 78 and by the lower cutter that there is not available a suitable space for an additional element through which a lubricant could be supplied to it. Nevertheless, the invention provides a solution of this problem by utilizing the vertical rotary guard or abutment 62 to deliver a lubricant to the cutter 22. Accordingly, the member 62 is preferably tubular in form from its upper end nearly but not quite to its lower end to provide a duct 134, and radial ducts or outlet ports 136 extend from the duct 134 to the periphery of the member adjacent to the cutter 22. Thus, by maintaining a supply of liquid in the duct 134 the liquid will overflow the ports 136, and the centrifugal force due to rotation of the member 62 will throw the liquid against the flat rear face 26 of the cutter 22.

A novel device is provided to feed the lubricating liquid into the duct 134. As shown, a horizontal branch tube 138 of capillary size communicates with the cup 130 to afford an outlet for the lubricant. The outer end of this tube is open and above the upper end of the member 62. One end of a bent wire 140 is arranged in the tube 138 and the other end is arranged in the duct 134, and as the liquid fills the tube 138, under regulation of a valve 142, it runs slowly down the wire 140 and into the duct 134. This device restricts the flow of liquid into the duct 134 to prevent a too copious supply in the latter.

Having thus described my invention, what I claim as new and desire to secure by Letters Patent of the United States is:

1. A trimming machine comprising a pair of cooperative rotary driven shearing cutters arranged to sever a fin projecting from a face of an article of work with a cut that is flush with said face, one of said cutters having a thin acute cutting edge at the rear and a beveled work-engaging face projecting from said edge in front of the shearing plane to lie against said face of the work, and a rotary member arranged behind the shearing plane, the periphery of said rotary member being arranged to engage said face of the work in said plane adjacent to the cutting point to prevent that face from crossing said plane.

2. A trimming machine comprising two cooperative shearing cutters arranged to sever a fin projecting from a face of an article of work with a cut that is flush with said face, and two cooperative abutments arranged at opposite sides of the shearing locality to engage said face in the shearing plane to prevent said face from crossing said plane between them.

3. A trimming machine comprising two cooperative shearing cutters arranged to sever a fin projecting from a face of an article of work with a cut that is flush with said face, two cooperative abutments arranged at opposite sides of the shearing locality to engage said face in the shearing plane to prevent said face from crossing said plane between them, one of said abutments being rotary, and means for driving said rotary abutment to assist the feeding of the work.

4. A trimming machine comprising two cooperative shearing members arranged to sever a fin projecting from a face of an article of work with a cut that is flush with said face, a rotary abutment the periphery of which is tangent to the shearing plane and arranged to engage said face adjacent to and in advance of the shearing locality, and means for driving said abutment to feed the work.

5. A trimming machine comprising two rotary cutters arranged in shearing relation, the axes thereof being one above the other and the upper one of said cutters being in front of the lower one and having a sharp acute cutting edge, means arranged to support a fin-bearing article of work so that the fin-bearing face thereof may run on the front face of said upper cutter while the fin is being severed by said cutters, and a rotary abutment arranged behind but tangent to the shearing plane to engage said fin-bearing face adjacent to the shearing locality.

6. A trimming machine comprising two rotary cutters arranged in shearing relation, the axes thereof being one above the other and the upper one of said cutters being in front of the lower one and having a sharp acute cutting edge, means arranged to support a fin-bearing article of work so that the fin-bearing face thereof may run on the front face of said upper cutter while the fin is being severed by said cutters, and driven feed-roll arranged behind but in tangent relation to the shearing plane and at the feeding-in side of the shearing locality to engage said fin-bearing face of the work.

7. A trimming machine comprising means for supporting an article of work having a fin projecting laterally from an upright face of the article, a rotary disk cutter having a flat rear face and a beveled front face forming a sharp acute cutting edge, said beveled face being arranged to run on said face of the article, another rotary disk cutter the front face of which laps the rear face of the first said cutter in shearing relation to sever said fin flush with said face of the article, and rotary means arranged behind but in tangent relation to the shearing plane and at the feeding-in side of the cutters to prevent said face of the article from intersecting the shearing plane adjacent to the cutters.

8. A trimming machine comprising a pair of cooperative rotary driven shearing cutters arranged to sever a fin projecting from a face of an article of work with a cut that is flush with said face, one of said cutters having a thin acute cutting edge at the rear and a beveled work-engaging face projecting from said edge in front of the shearing plane to lie against said face of the work, and a rotary work-guiding member the periphery of which is substantially tangent to the rear face of said acute-edged cutter at the feeding-in side thereof.

9. A trimming machine comprising a trimming cutter, a grinding device for sharpening said cutter, means arranged to guide said grinding device to and from said cutter, and a work-guiding member movable by said grinding device to and from a work-guiding position in the path of said device.

10. A trimming machine comprising a trimming cutter, a movable grinding device for sharpening said cutter, means arranged to guide said grinding device to and from said cutter, a work-guiding member movable to and from a work-guiding position in the path of said grinding device, and means arranged to communicate motion from one to the other of said work-guiding member and said grinding device so that one of them, in moving to and from its operative position, will retract and advance the other.

11. A trimming machine comprising a trimming cutter, a grinding device movable to and from said cutter, means arranged to guide said grinding device to and from an operative position, a guard movable relatively to said grinding device to and from an operative position between said cutter and said grinding device, and means arranged to communicate the to-and-fro motions of said grinding device to said guard so that the two latter will occupy their respective operative positions alternatively, the latter said means being constructed and arranged to maintain said guard positively in its operative position.

12. A trimming machine comprising a trimming cutter, a grinding device for sharpening said cutter, means arranged to guide said grinding device to and from an operative position, and a cutter guard movable relatively to said grinding device and arranged to be shifted to and fro by said grinding device so that it will stand adjacent to said cutter when said grinding device is retracted, and vice versa.

13. A trimming machine comprising a trimming cutter, means for operating said cutter, and means arranged to supply a lubricant to the work-engaging portion of said cutter, an element of the latter said means being rotatable and arranged to guide the work by rolling contact therewith.

14. A trimming machine comprising a trimming cutter, means for operating said cutter, and means arranged to supply a lubricant to the work-engaging portion of said cutter, the latter said means including a rotary driven member arranged to feed the work.

15. A trimming machine comprising a trimming cutter, means for operating said cutter, and means arranged to supply a lubricant to the work-engaging portion of said cutter, the latter said means including a rotary member arranged to guide the work and deposit lubricant on the work-engaging portion of said cutter.

16. A trimming machine comprising a trimming cutter, means for operating said cutter, and lubricating means including a hollow rotary member arranged to engage and guide the work, said member having an outlet port arranged to discharge a lubricant against the work-engaging portion of said cutter.

17. A trimming machine comprising a trimming cutter, means for operating said cutter, a hollow rotary member arranged to engage and guide the work, means arranged to supply a lubricant to the interior of said rotary member, and means arranged to drive said rotary member, the latter having an outlet port through which lubricant is discharged by centrifugal force and precipitated against said cutter.

18. A trimming machine comprising a trimming cutter, means for operating said cutter, a hollow member arranged in contiguous relation to said cutter to engage and guide the work, and means arranged to supply a lubricant to the interior of said hollow member, the latter having an outlet port arranged to emit lubricant against a face of said cutter.

19. A trimming machine comprising a trimming cutter, means for operating said cutter, a hollow driven roll of which one portion of the periphery is in tangent relation to a face of said cutter, and means arranged to supply a lubricant to the interior of said roll, the latter having an outlet port arranged to discharge lubricant by centrifugal force against said face of said cutter.

20. A trimming machine comprising a trimming cutter, means for operating said cutter, a member arranged in contigous relation to said cutter and having a duct arranged to discharge a liquid lubricant on said cutter, a gravity feed tube of capillary size arranged to discharge such lubricant above the level of said member, and a slender wire arranged to conduct such lubricant by surface tension from said tube into said duct.

21. A trimming machine comprising a trimming cutter, means for operating said cutter, and means arranged to supply a lubricant to the work-engaging portion of said cutter, an element of the latter said means being tubular and having a peripheral surface arranged to engage an article of work to guide the article to said cutter.

In testimony whereof I have signed my name to this specification.

SIDNEY J. FINN.

CERTIFICATE OF CORRECTION.

Patent No. 1,807,835.                        Granted June 2, 1931, to

SIDNEY J. FINN.

It is hereby certified that error appears in the printed specification of the above numbered patent requiring correction as follows: Page 1, line 38, for the word "several" read severed; line 100, for "element" read work-guiding member; page 2, line 27, for "similarly" read similar; and that the said Letters Patent should be read with these corrections therein that the same may conform to the record of the case in the Patent Office.

Signed and sealed this 6th day of October, A. D. 1931.

(Seal)                                                               M. J. Moore,
                                                                    Acting Commissioner of Patents.